June 28, 1966  H. E. MAITLAND  3,258,083
IGNITION CONTROL SAFETY APPARATUS FOR TRACTORS
Filed Jan. 22, 1964  3 Sheets-Sheet 1
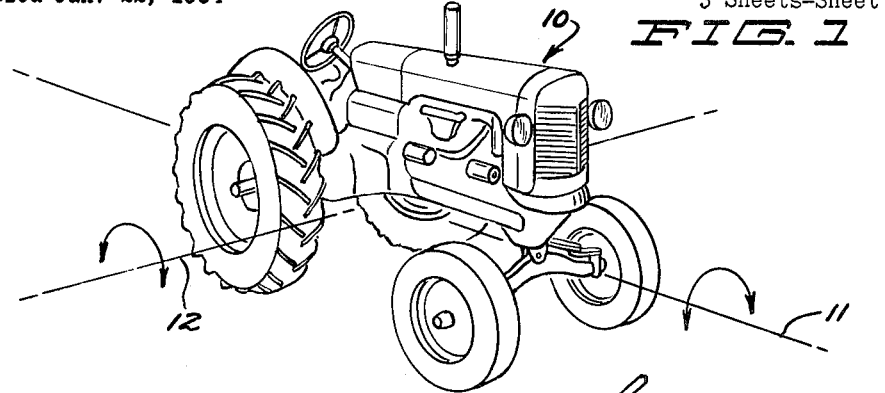
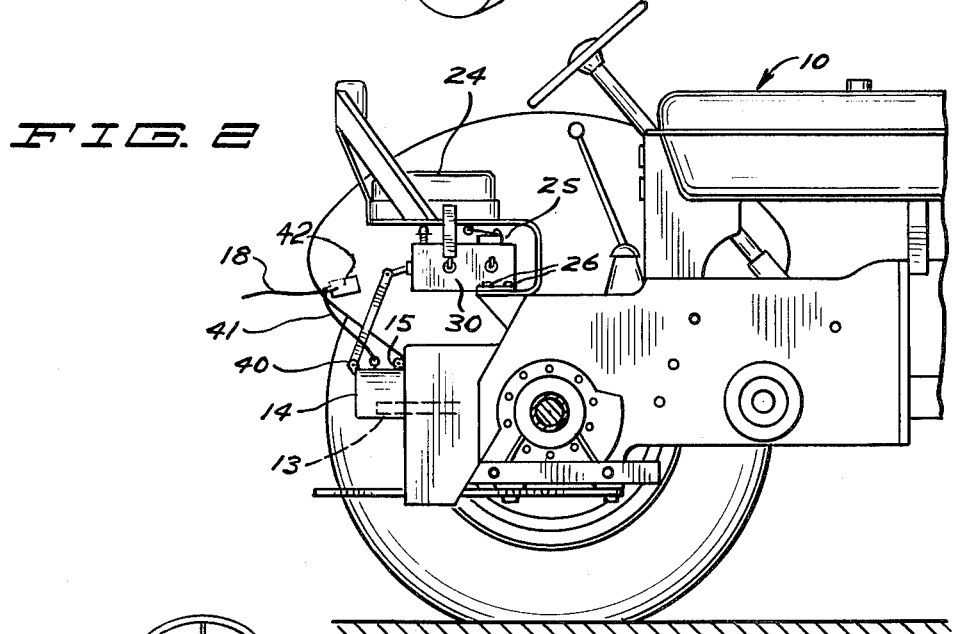
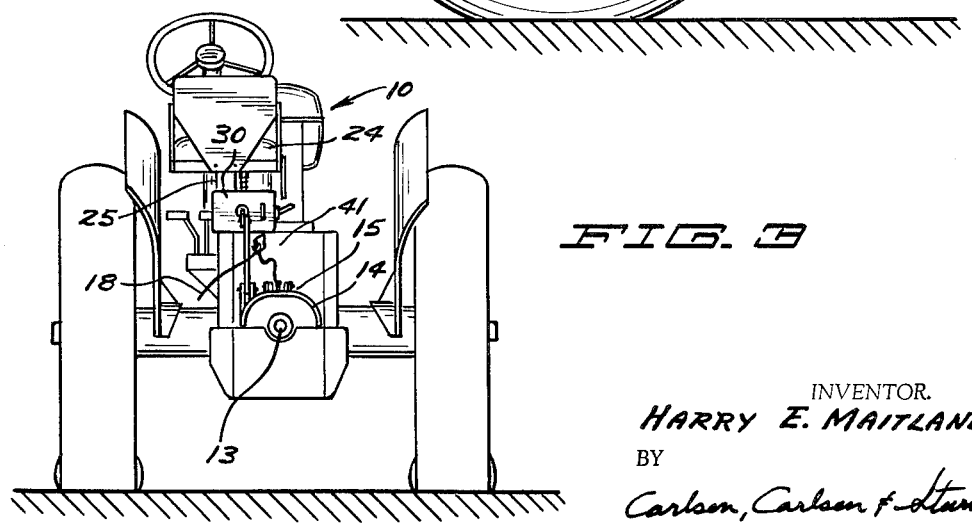
INVENTOR.
HARRY E. MAITLAND
BY
Carlson, Carlson & Sturm
ATTORNEYS June 28, 1966  H. E. MAITLAND  3,258,083
IGNITION CONTROL SAFETY APPARATUS FOR TRACTORS
Filed Jan. 22, 1964  3 Sheets-Sheet 2
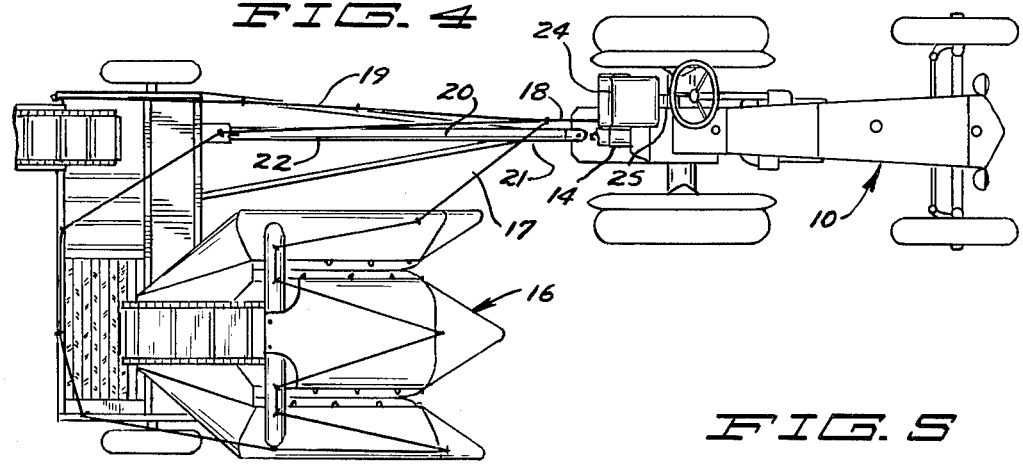
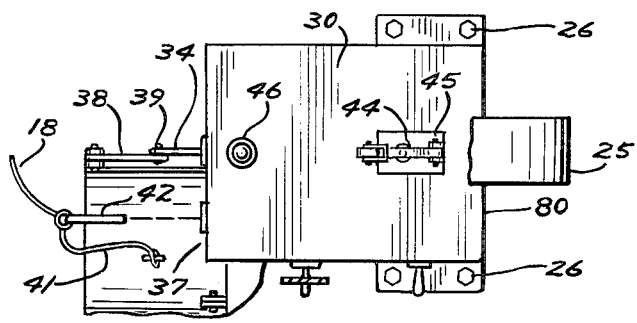
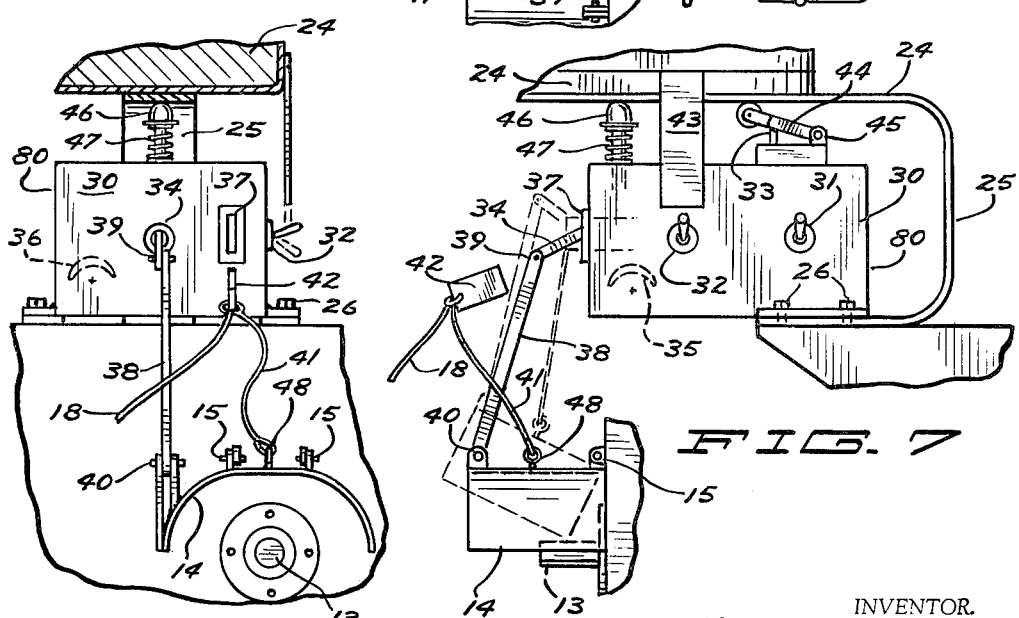
INVENTOR.
HARRY E. MAITLAND
BY
Carlson, Carlson & Sturm
ATTORNEYS June 28, 1966  H. E. MAITLAND  3,258,083
IGNITION CONTROL SAFETY APPARATUS FOR TRACTORS
Filed Jan. 22, 1964  3 Sheets-Sheet 3
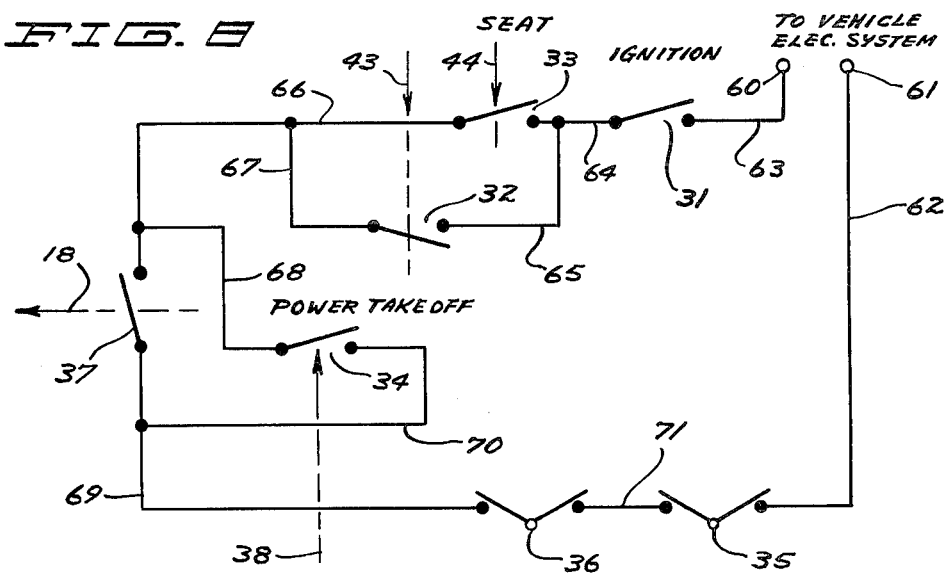
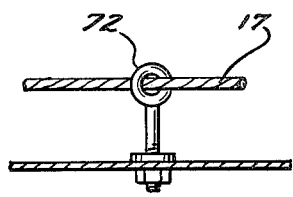
INVENTOR.
HARRY E. MAITLAND
BY
Carlson, Carlson & Sturm
ATTORNEYS

United States Patent Office 3,258,083
Patented June 28, 1966

3,258,083
IGNITION CONTROL SAFETY APPARATUS
FOR TRACTORS
Harry E. Maitland, 1220 La Salle Ave.,
Minneapolis, Minn.
Filed Jan. 22, 1964, Ser. No. 339,450
4 Claims. (Cl. 180—82)

This invention relates generally to apparatus and devices for preventing unsafe operation of a motor vehicle and is more particularly directed to apparatus, devices and equipment for use in combination with motor vehicles normally operative in an off-the-highway type of environment.

While my invention is not limited to a particular use, the environment of the average farm or agricultural endeavor has indicated the need for suitable apparatus for ensuring the safety of an operator of motor vehicles and associated equipment. The prior art contains numerous examples of apparatus which is designed to protect an operator from various conditions which may be encountered in connection with the operation of a motor vehicle and accessories therefor. As may be apparent from a consideration of the present status of the market and the availability of equipment for use with such vehicles, the prior art devices have proven unsuitable, for one reason or another, and most of the devices and apparatus proposed for use in this connection have been removed from the market and are no longer available. Meanwhile, the possible danger to operators of such equipment has continued and, in many cases, has increased due to the complexity, size and operating conditions imposed in the operation of such equipment.

In the present invention, I have provided a novel and improved apparatus which, when combined with vehicles and accessories therefor, will provide safe and efficient operation of such vehicles.

As will become apparent from a consideration of the detailed description of my invention below, I provide apparatus which will efficiently handle all of the contingent dangers to which an operator may be subjected in performing his day to day tasks involving the use of motor vehicles and associated equipment. The apparatus is designed to enable the operator to utilize the equipment to its fullest extent and at the same time, apprise him of the constant dangers that are present in operation of the equipment and enable him to adequately avoid such dangers in carrying out the operations necessary.

It is therefore an object of my invention to provide a novel and improved safety control apparatus for a motor vehicle.

It is a still further object of my invention to provide an improved safety control apparatus which will enable an operator of a motor vehicle to de-energize the driving means of the vehicle from positions remote to the normal controls of the vehicle.

Another object of my invention is to provide an improved apparatus for use in combination with an operator supporting means on a motor vehicle to allow operation thereof whether the operator is in a standing or sitting position and to automatically control the operation of the vehicle in accordance with the position of the operator.

A still further object of my invention is to provide an improved switching means responsive to deviations of a motor vehicle from its normal attitude to control the energization of the motive means of the vehicle to prevent unsafe operation thereof.

A still further object of my invention is to provide an improved safety control apparatus for use in combination with a motor vehicle having a power take-off means and operator supporting means.

Another object of my invention is to provide improved safety control apparatus for use in combination with a vehicle and accessories and appliances therefor.

A still further object of my invention is to provide improved safety control apparatus for use in combination with a vehicle having a power take-off and with which accessories connected to the power take-off and towed by the vehicle are utilized.

These and other more detailed and specific objects will be disclosed in the course of the following specification, reference being had to the accompanying drawings, in which:

FIG. 1 is a perspective three-quarter side view of an off-the-highway type farm tractor.

FIG. 2 is an enlarged side view of a portion of the tractor shown in FIG. 1 with one of the wheels removed to show the relative position of the various features of my invention in position on the tractor.

FIG. 3 is a rear view of the tractor shown in FIGS. 1 and 2.

FIG. 4 is a plan view of the tractor shown in FIG. 1 having an implement attached thereto.

FIGS. 5, 6 and 7 are top, rear and side elevational views of the control apparatus embodying the principles of my invention including fragmentary portions of the tractor shown in FIGS. 1 to 4.

FIG. 8 is a schematic diagram of an electrical circuit illustrating the principles of my invention.

FIG. 9 is a fragmentary partly sectional view illustrating the details of a further feature of my invention.

Referring now to the drawings in which like elements may be identified by like reference numerals, there is shown in FIG. 1 a tractor 10 which may be, for example, the familiar tractor utilized on a great number of farms for drawing and/or carrying the various implements involved in farming operations. Tractor 10 is normally operative over fields and the like, or off-the-highway type operation, and under normal operating conditions the body of tractor 10 rotates about a pair of axes indicated as longitudinal axis 11 and lateral axis 12. Tractor 10 also includes an operator support seat means 24 which may be, for example, supported by a U-shaped spring member 25 which is attached at one end to the lower portion of support member 24 and at the other end to the frame of tractor 10 through suitable fastening means shown as bolts 26. Tractor 10 also includes a power take-off shaft 13 that is driven through suitable transmission means from the engine of tractor 10. A suitable cover 14, hingedly attached to the rear portion of tractor 10 above power take-off shaft 13, is normally provided as a safety device to prevent injury to an operator when the power take-off shaft is not connected to an accessory or appliance.

While not shown on the drawings, those skilled in the art will be aware that the motive power on a motor vehicle requires the use of current controlling equipment to energize a power plant and this equipment may take the form of an ignition system for an internal combustion engine which may be energized from a battery, from a suitable magneto or, in some instances, the vehicle may be driven by the use of suitable electric motors. In any event, the operation of the motor means or drive means for a vehicle may in substantially all cases that I am aware of be effected through the use of suitable current controlling means.

In the various figures of the drawings, my invention is shown embodied in suitable current controlling means indicated generally by the reference character 30 and, as shown on FIGS. 2 and 3 of the drawings, is comprised of a generally rectangular shaped housing, or box, that may conveniently be mounted underneath operator support means 24 in readily accessible position to the operator of the vehicle.

In FIG. 4, an accessory, in the form of a corn picker 16, is shown attached to tractor 10 by suitable hitch means and includes a shaft which is attached to the power take-off on the tractor 10 for driving the various devices normally found on a corn picker. It may be appreciated that the corn picker, in its present form, is a relatively dangerous piece of equipment to operate and therefore has been selected to illustrate the operation of one of the features of my invention.

Referring now to FIGS. 5, 6 and 7 of the drawings, control apparatus 30 is shown comprised of a generally rectangular housing 80 which may be of any suitable size consistent with the particular vehicle to which it will be attached and the equipment and apparatus to be housed therein and mounted thereon.

The rear of housing 80 has a pair of switches 34 and 37 securely mounted thereon. Switch 34 has an outwardly extending handle that is pivotally connected through a pivot pin means 39 to an arm 38 which in turn is pivotally connected to the rear of cover member 14 through suitable connecting means 40 and is adapted, upon movement of cover member 14 about its mounting 15, to uncover power take-off shaft 13 and to actuate switch means 34 from a normally closed position to an open position. Switch means 37 is comprised of a jack mounted on the rear of enclosure 80 which is adapted to receive a conductive plug member 42 and as such comprises a normally open switch means which may be closed by insertion of plug member 42. Plug member 42 is provided with a suitable aperture and is attached by suitable means to a life line cord indicated by reference numeral 18 which may be appropriately disposed through suitable mounting means 72, as shown for example in FIG. 11, about a vehicle, and/or an appliance or accessory utilized in connection with the vehicle, to provide a means for de-energizing the motor of the vehicle from remote positions at the discretion of the operator. Plug member 42 is also conneced through suitable fastening means, for example cord 41, to a connecting member 48 stationarily positioned on cover member 14 for power take-off shaft 13. Connecting line 41 may be of a suitable length to prevent the insertion of plug member 42 in switch means 37 when cover member 14 is in its normal position of covering power take-off shaft 13.

The right side of enclosure 80 has mounted thereon a further pair of single-pole single-throw switching means 31 and 32. Switching means 31 corresponds to the normal ignition switch found on substantially all motor vehicles and while it is shown in the form of a toggle operated switch, it may conveniently be a key operated switch or the like. Switch means 32 is provided to allow manual operation of the vehicle in the sense that normal operation of my control apparatus requires the presence of the operator on the support means or seat 24, and where it is necessary for an operator to, for example, operate the vehicle from a standing position, this means is provided for such operation. The operating handle on switch means 32 is shown in its normal position which provides automatic operation. An actuating member for switch means 32 is shown in the form of a downwardly extending bracket 43 attached to the lower side of support member 24 and is adapted to automatically place switch means 32 in its normally open position when a weight is placed on seat member 24 as, for example, when occupied by an operator or a momentary force is applied should an operator fall from a standing position and strike the seat 24.

The top of enclosure 80 has mounted thereon an upwardly extending pin member 46 which is biased upwardly by a spring means 47. Pin member 46 is adapted to engage the lower part of support member 24 to tend to maintain the same in a normally raised position with respect to the top of enclosure 80. A further normally open switch means 33 is positioned for coaction with arm member 44 adapted to pivot about suitable mounting means 45 on housing 80. Switch means 33 may be comprised of a plunger operated switch means that may be rendered conductive upon displacement of the plunger by, for example, arm member 44 that, when engaged at its upper extremity by the lower portion of support member 24 pivots downwardly about its mounting 45 to engage the plunger on switch 33 and render the switch conductive in response to the presence of a weight or force on seat member 24.

A pair of attitude responsive switch means 35 and 36 are shown in phantom and are normally mounted on the inside of enclosure 80 on suitable mounting means which render the switches responsive to variations in the attitude of the vehicle about longitudinal and lateral axes 11 and 12 respectively.

Referring now to FIG. 8, a schematic and diagrammatic sketch of my electrical control apparatus is illustrated as having a pair of terminals 60 and 61 adapted for connection to the electrical system of a vehicle in a suitable manner to control the operation of the motor thereon. As noted above, the various types of energization systems for motors in such vehicles will require modifications that may easily be determined by those skilled in the art upon learning the principles of my invention and the particular manner in which my control apparatus is connected to control the operation of the motor of the vehicle has, therefore, not been illustrated in the drawings. However, for example, terminals 60 and 61 may be connected in series with the low tension circuit in a battery energized ignition system and as such will provide satisfactory operation in accordance with the principles of my invention.

As may be noted from FIG. 8, a series circuit is provided intermediate terminals 60 and 61 through conductor 63, single-pole single-throw ignition switch means 31, conductor 64, single-pole single-throw normally open switch means 33 having normally open single-pole single-throw switch means 32 connected in parallel therewith through conductors 65 and 67, conductor 66, normally open single-pole single-throw life line switch means 37 having normally closed single-throw single-pole switch means 34 connected in parallel therewith through conductors 68 and 70, conductor 69, attitude responsive switch means 36, conductor 71, attitude responsive switch means 35 and conductor 62 connected to terminal 61. Driving means for controlling the operation of switch means 33, 32, 37 and 34 are indicated respectively by reference numerals 44, 43, 18 and 38. These driving means illustrated in dotted line form correspond to the means and members described above in connection with FIGS. 5, 6 and 7.

Referring again to FIG. 4 and to FIG. 11, life line member 18 connected to plug 42 is shown disposed about corn picker 16. The plurality of life lines 17, 19 and 22 are shown connected to line 18 through suitable fastening means 21 and 20 respectively. The life lines may conveniently be disposed on and about a vehicle or its accessories and appliances through the use of suitable stanchion means 72 shown in FIG. 11 in the form of eye bolts which may be suitably fastened to the body of the vehicle, appliance or accessory, and are such as will allow the free movement of the several life lines therethrough to enable an operator to withdraw plug 42 from switch means 37 to de-energize the motor on the vehicle. Suitable means (not shown) may be provided for receiving and holding line 18 and plug 42 when the vehicle is operated with accessories not requiring the safety feature of this portion of my invention.

*Operation*

A consideration of the illustrations and the description noted above will clearly indicate that my control apparatus utilizes a series circuit including the above noted plurality of switch means intermediate a pair of terminals 60 and 61 connected to control the operation of the motor on a vehicle so that the motor may be operative when a complete series conductive circuit exists between terminals 60 and 61 and when for any reason the series circuit is interrupted, the motor on the vehicle will be de-energized. In FIG. 8 of the drawing, the various schematically represented switching means are shown in their normal positions.

When it is desired to operate the vehicle and energize the motor thereof, an operator will assume his normal position on the support seat member 24 and close normally open ignition switch means 31. His presence on seat 24 causes a downward deflection thereof which in turn rotates member 44 about its pivot mounting to close weight responsive switch means 33 to thereby complete a series circuit through normally closed power take-off switch means 34 and attitude responsive switch means 36 and 35 intermediate terminals 60 and 61. The motor may then be started through suitable starting means therefor (not shown).

If, for any reason, the operator does not desire to occupy the support seat means 24 or wishes to operate the vehicle from a standing position, switch means 32 may be closed to complete a series circuit from terminals 60 to 61, through switch means 31, switch means 32, switch means 34, switch means 36 and switch means 35. This allows manual operation of the tractor and provides for automatic return to the operation described above when the operator subsequently occupies the support seat means 24 or if support means 24 is momentarily subjected to a downward force. When either of these events occurs, bracket member 43 extending downwardly from the bottom of support seat member 24 engages switch 32 to actuate the same to its normally open position and if the force continues to be present, member 44 actuates switch means 33 to a closed position to maintain a closed series circuit intermediate terminals 60 and 61. However, if the force is a momentary force, switch 33 will again assume its normally open position and the motor of the vehicle will be de-energized. The momentary force described above may occur, for example, if the operator falls from a standing position on a vehicle and because the operating mechanism of the vehicle is generally in proximity to the support seat member therefor, it is highly unlikely that an operator falling therefrom will not at least momentarily apply a downward force to support seat member 24 so as to practically ensure the operation of my control apparatus to de-energize the motor on the vehicle. It might also be noted that under normal operating conditions, if for any reason the operator leaves the support seat member, the series circuit will be opened and the motor de-energized.

When cover member 14 for power take-off shaft 13 is raised from its safety protective position of covering the shaft, member 38 will actuate power take-off safety switch 34 from its normally closed position to an open position to prevent energization of the motor on the vehicle or to de-energize the motor on the vehicle in the event it had been energized when the cover member 14 is raised to expose the power take-off shaft 13. In order to provide subsequent re-energization of the motor on the vehicle, it is then necessary to insert conductive plug member 42 in switch means 37 to complete the series circuit intermediate the terminals 60 and 61 through normally open switch means 37. This operation may easily and conveniently be performed at the time as equipment is connected to the power take-off shaft 13. It may be noted that line 41 connected intermediate plug 42 and cover member 14 may be of a length which will prevent insertion of conductive plug 42 into switch means 37 until such time as cover member 14 is raised to its position of exposing the take-off shaft 13 so that should for any reason switch 34 be defective, the motor on the vehicle may not be energized until such time as the operator inserts plug 42 into switch means 37.

In the last described operation, accessories and appliances utilizing power derived from the power take-off shaft 13 may include suitable life lines for connection to line 18 connected to plug 42 for removing the same from switch means 37 to de-energize the motor on the vehicle from positions which are readily accessible to an operator in the event an emergency arises. For example, in the illustrated accessory, numerous accidents are reported each year in which the arm of an operator may become entangled in the operating mechanism for picking corn and if a conveniently located life line, such as may be provided according to the principles of my invention, were present to allow the operator to de-energize the motor on the vehicle, the number of injuries would be substantially reduced and the extent of injuries which may occur before the motor can be de-energized would likewise be substantially reduced. It may occur to those skilled in the art that switch 34 may be eliminated from the circuit shown in FIG. 8 and the life line feature, by itself or in combination with the remainder of the features of my invention, may be utilized. For example, there are many self-propelled vehicles which are not or may not be utilized in connection with towed appliances or accessories requiring power from a vehicle and the attendant power take-off safety cover illustrated in the drawings on a farm tractor, but which still require the use of safety control apparatus. Self-propelled combines and the like are but one example of equipment which may benefit from the use of the principles of my invention.

Switches 35 and 36 are operative to de-energize the motor on a vehicle when the attitude of the vehicle about its longitudinal and/or lateral axes, from a vertical position, exceeds a predetermined angle. This, of course, is to prevent serious accidents involving overturning of the vehicle from occurring as it has been determined in the past that de-energization of the motor on a vehicle when it has tipped a predetermined amount will result in the vehicle returning to its normal upright attitude. Rotation of the vehicle to a predetermined angle from a vertical upright position will result in a discontinuity between terminals 60 and 61 to de-energize the motor on the vehicle when the switches are connected in the manner shown in FIG. 8.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a vehicle of the class above described, operator safety control apparatus comprising in combination:

(a) a pair of terminals adapted for connection to the ignition system of a vehicle whereby circuit control means intermediate said terminals may be operative to control said ignition system;

(b) an operator support member mounted on said vehicle, said support member being operative to resiliently support the weight of an operator;

(c) first normally non-conductive switch means mounted in proximity to said support member and being operable to a conductive position upon engagement by said support member upon downward movement thereof in response to the weight of an operator;

(d) second normally conductive switch means mounted in proximity to said support member, said second switch means including means for manually rendering said second switch means conductive, said means for manually rendering said second switch means conductive including means responsive to downward movement of said support member for rendering said second switch means non-conductive; and (e) circuit means connecting said first and second switch means in parallel and intermediate said terminals, whereby said first switch means is operative to render the ignition system of said vehicle operative when an operator is present on the support member and said second switch means is operative, upon manual operation to a conductive state, to render the ignition system of a vehicle operative when said support member is unoccupied and is operative to render said ignition system inoperative after a momentary downward movement of said support member.

2. The apparatus of claim 1 and the combination comprising:
(a) a manually operable protective means disposed on the vehicle in operative relationship with a power take-off shaft and operable between positions of covering and exposing said shaft;
(b) a third switch means connected intermediate the first and second switch means and one of the terminals; and
(c) means, connected intermediate said power take-off and said third switch means, rendering said third switch means conductive only when said manually operable protective means is in a power take-off covering position.

3. The apparatus of claim 1 in which biasing means are operatively connected to the first switch means to provide an upwardly directed biasing force.

4. The apparatus of claim 2 in which biasing means are operatively connected to the first switch means to provide an upwardly directed biasing force.

References Cited by the Examiner

UNITED STATES PATENTS

| | | | |
|---|---|---|---|
| 1,969,929 | 8/1934 | Heden | 180—82 |
| 2,250,754 | 7/1941 | Dooley | 180—82 |
| 2,550,999 | 5/1951 | Hoffman et al. | 180—82 |
| 2,640,898 | 2/1953 | White | 180—82 X |
| 2,655,579 | 10/1953 | Burroughs. | |
| 2,660,715 | 11/1953 | Glass et al. | |
| 2,782,276 | 2/1957 | Woods | 200—61.47 |
| 2,986,616 | 5/1961 | Hanserd | 200—61.52 |

BENJAMIN HERSH, *Primary Examiner.*

A. HARRY LEVY, *Examiner.*

E. E. PORTER, *Assistant Examiner.*